(12) United States Patent
Woodard

(10) Patent No.: US 11,427,132 B2
(45) Date of Patent: Aug. 30, 2022

(54) AUTOMOTIVE CLOTHES HANGING DEVICE

(71) Applicant: Adam Woodard, Hendersonville, TN (US)

(72) Inventor: Adam Woodard, Hendersonville, TN (US)

( * ) Notice: Subject to any disclaimer, the term of this patent is extended or adjusted under 35 U.S.C. 154(b) by 0 days.

(21) Appl. No.: 17/024,114

(22) Filed: Sep. 17, 2020

(65) Prior Publication Data

US 2022/0080896 A1 Mar. 17, 2022

(51) Int. Cl.
*B60R 7/10* (2006.01)
*A47G 25/14* (2006.01)

(52) U.S. Cl.
CPC ............ *B60R 7/10* (2013.01); *A47G 25/1442* (2013.01); *A47G 25/1457* (2013.01)

(58) Field of Classification Search
CPC .. B60R 7/10; A47G 25/1442; A47G 25/1457; A47G 25/145; A47F 5/0006; Y10S 224/927; Y10T 24/31
USPC .......... 211/113; 248/690; 224/563, 560, 567, 224/572, 311, 313, 318, 927; 24/573.09, 24/584.1
See application file for complete search history.

(56) References Cited

U.S. PATENT DOCUMENTS

| | | | | |
|---|---|---|---|---|
| 1,290,433 A * | 1/1919 | Walker | ................... | A47F 5/0006 248/690 |
| 1,343,301 A * | 6/1920 | Bills | ...................... | A47H 11/02 248/690 |
| 1,913,105 A * | 6/1933 | Baland Case | ......... | A47L 13/512 206/362 |
| 2,112,339 A * | 3/1938 | Kasparek | ............. | A63B 57/203 224/249 |
| 2,339,719 A * | 1/1944 | Waters | ...................... | G09F 3/12 248/690 |
| 2,549,712 A * | 4/1951 | Schwartz | .................. | B60R 7/10 224/482 |
| 2,670,112 A | 2/1954 | Kohlbeck | | |
| 2,747,781 A | 5/1956 | Schofield | | |
| 2,754,532 A * | 7/1956 | Kanehl | ................... | A41B 15/00 15/209.1 |
| 2,782,974 A * | 2/1957 | Borgfeldt | .................. | A45F 5/10 294/159 |
| 3,212,647 A * | 10/1965 | Meyer | ................ | A47G 25/1457 211/118 |

(Continued)

FOREIGN PATENT DOCUMENTS

WO WO1996036262 11/1996

*Primary Examiner* — Jennifer E. Novosad

(57) ABSTRACT

An automotive clothes hanging device for hanging multiple clothes hangers with clothes without impeding visibility includes a strap, which has a pair of holes positioned therein. Each hole is positioned proximate to a respective opposed end of the strap. A fixed hanger hook of a vehicle is inserted into one of the holes so that the strap is engaged thereto. A hook of a clothes hanger is inserted into the other of the holes is configured so that the clothes hanger is engaged to the strap. The strap also can be folded so that holes of the pair of holes are aligned. The strap defines a loop when the fixed hanger hook of the vehicle is inserted into the pair of holes. The hook of the clothes hanger can be inserted into the loop. Multiple clothes hangers with clothes thereon can be hung from the strap without impeding visibility.

6 Claims, 5 Drawing Sheets

(56) References Cited

U.S. PATENT DOCUMENTS

| | | | | |
|---|---|---|---|---|
| 3,299,442 A * | 1/1967 | White | A61G 7/0503 | 604/322 |
| 3,334,794 A * | 8/1967 | Saari | F42B 39/02 | 224/150 |
| 3,355,031 A | 11/1967 | Kleehammer | | |
| 3,584,772 A * | 6/1971 | Robertson | A47G 25/1457 | 294/142 |
| 3,667,712 A * | 6/1972 | Furgueson | F16L 33/00 | 248/75 |
| 3,754,724 A * | 8/1973 | Osowski | A47G 33/004 | 248/690 |
| D243,062 S * | 1/1977 | Malloy | D8/382 | |
| 4,157,166 A * | 6/1979 | Voelker | A45C 11/04 | 224/250 |
| 4,631,783 A * | 12/1986 | Hayashi | F16M 13/00 | 211/70.6 |
| 4,662,873 A * | 5/1987 | Lash | A61M 25/02 | 128/DIG. 26 |
| 4,718,546 A * | 1/1988 | Kolton | A47G 25/14 | 206/278 |
| 4,749,160 A * | 6/1988 | Shih | B25H 3/04 | 211/66 |
| 4,856,688 A * | 8/1989 | Ackmann | A47G 25/1457 | 224/217 |
| 4,889,268 A * | 12/1989 | Shubeck | B60R 13/00 | 224/277 |
| 4,911,394 A * | 3/1990 | Ericson | B66C 1/34 | 248/301 |
| 4,957,232 A * | 9/1990 | Sprague | A45F 5/02 | 224/249 |
| 5,104,083 A | 4/1992 | Shannon | | |
| 5,458,267 A * | 10/1995 | Curtis | A45F 5/02 | 2/338 |
| D370,407 S * | 6/1996 | Pietrowski | D8/394 | |
| 5,620,127 A * | 4/1997 | MacKenzie | A47G 25/1457 | 223/89 |
| 5,799,376 A * | 9/1998 | Harsley | B65D 63/10 | 24/16 PB |
| D429,458 S * | 8/2000 | Shock | D8/373 | |
| 6,131,200 A * | 10/2000 | McNamara | A41D 25/003 | 2/144 |
| 6,220,489 B1 * | 4/2001 | Sato | A47C 7/64 | 223/94 |
| 6,273,376 B1 * | 8/2001 | Montgomery | A47G 25/1457 | 24/298 |
| 6,313,406 B1 * | 11/2001 | Gretz | H02G 3/26 | 174/135 |
| 6,344,021 B1 * | 2/2002 | Juster | A61N 2/06 | 600/15 |
| 6,490,767 B2 * | 12/2002 | Haiduk | B62J 7/08 | 24/16 PB |
| 6,523,229 B2 * | 2/2003 | Severson | B65D 63/1018 | 24/16 PB |
| 6,581,885 B2 * | 6/2003 | Polad | F16L 3/137 | 24/16 PB |
| 6,793,107 B2 * | 9/2004 | Karner | B60R 7/10 | 224/313 |
| D514,432 S * | 2/2006 | McLaughlin | D8/356 | |
| D535,562 S * | 1/2007 | Wisler | D9/434 | |
| 7,404,238 B2 * | 7/2008 | McNeill | B65D 63/1027 | 24/16 PB |
| D693,992 S * | 11/2013 | Dinunzio | D2/853 | |
| 8,631,950 B2 * | 1/2014 | Whelan | B01L 9/06 | 211/85.18 |
| 8,910,347 B1 * | 12/2014 | Wilcox | B65D 63/109 | 24/16 R |
| D740,106 S * | 10/2015 | Cooper | D8/356 | |
| 9,387,810 B1 * | 7/2016 | Bishop | A47H 1/02 | |
| 9,550,550 B1 * | 1/2017 | Housman | B63B 21/56 | |
| D813,016 S * | 3/2018 | Deneau | D8/356 | |
| D824,244 S * | 7/2018 | Rothbaum | D8/356 | |
| D848,822 S * | 5/2019 | Cooper | D8/356 | |
| D853,087 S * | 7/2019 | Yamamoto | D2/853 | |
| D857,484 S * | 8/2019 | Altamura | D8/356 | |
| D874,905 S * | 2/2020 | Gaddy | D8/356 | |
| 10,793,075 B2 * | 10/2020 | Nolan | B60R 7/043 | |
| 11,007,947 B2 * | 5/2021 | Gandhi | B60R 7/08 | |
| 2002/0073516 A1 * | 6/2002 | Behar | A47B 21/06 | 24/306 |
| 2005/0224540 A1 | 10/2005 | Chen | | |
| 2005/0251967 A1 * | 11/2005 | McNeill | B65D 63/1027 | 24/16 PB |
| 2005/0284902 A1 * | 12/2005 | Colesanti | A45F 5/10 | 224/250 |
| 2006/0289375 A1 * | 12/2006 | Haschke | A47F 5/0006 | 211/113 |
| 2007/0175841 A1 * | 8/2007 | Lyon | B01L 9/06 | 211/74 |
| 2009/0250419 A1 * | 10/2009 | Szegfi | A47K 10/22 | 211/85.5 |
| 2015/0101225 A1 * | 4/2015 | Jones | G09F 21/04 | 40/642.01 |
| 2018/0084886 A1 * | 3/2018 | O'Hare | A45D 8/34 | |
| 2019/0135496 A1 * | 5/2019 | Borden | A45F 5/022 | |
| 2022/0080896 A1 * | 3/2022 | Woodard | A47G 25/1457 | |

* cited by examiner

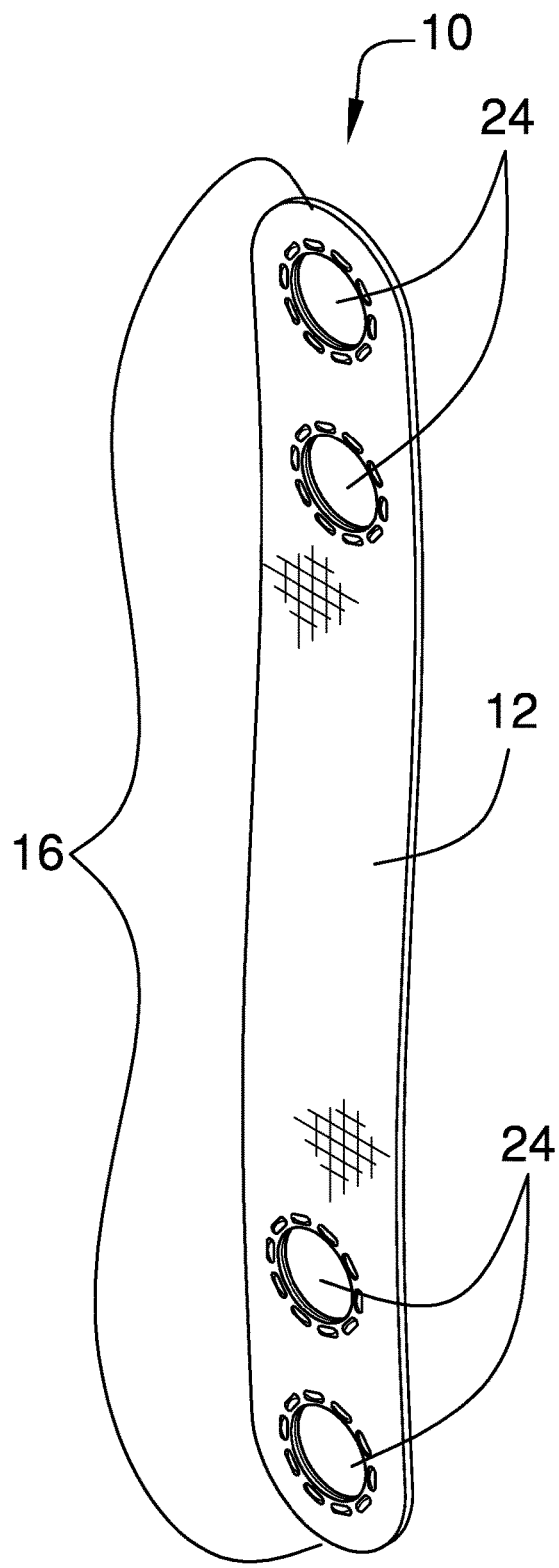
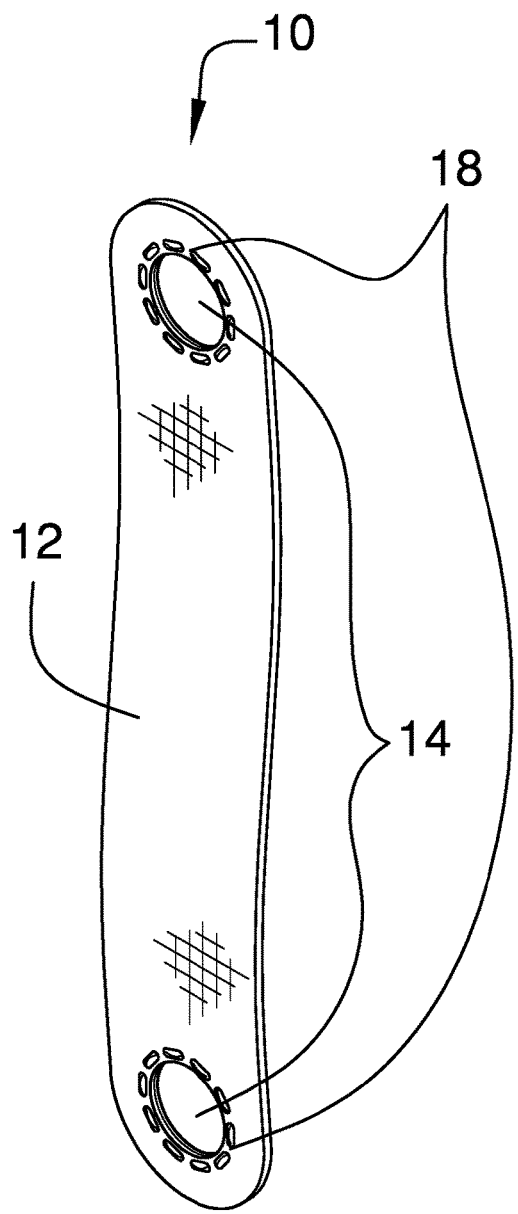
FIG. 1a
FIG. 1b

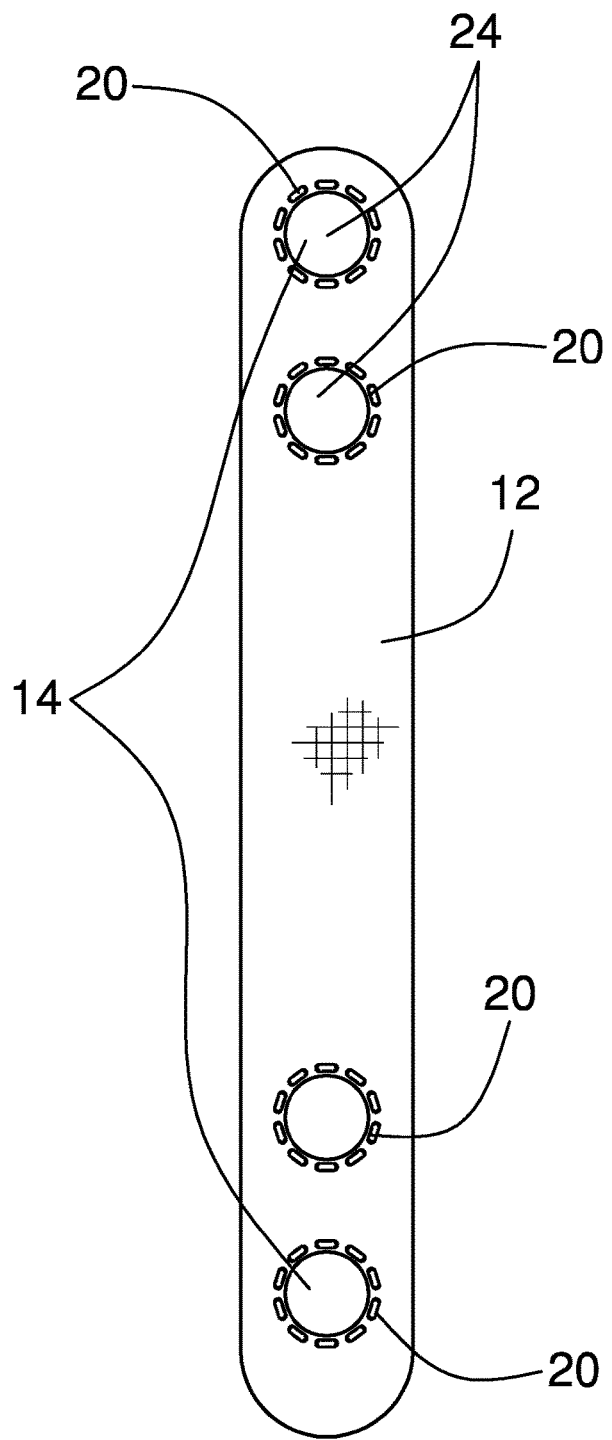
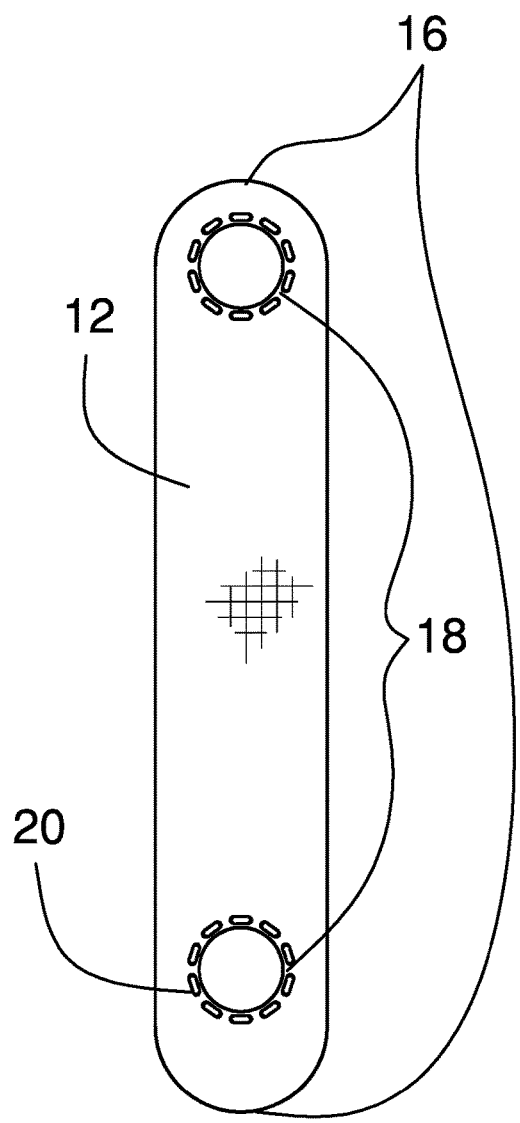
FIG. 2a
FIG. 2b

AUTOMOTIVE CLOTHES HANGING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to clothes hanging devices and more particularly pertains to a new clothes hanging device for hanging multiple clothes hangers with clothes without impeding visibility.

(2) Description of Related Art Including Information Disclosed Under 37 CFR 1.97 and 1.98

The prior art relates to clothes hanging devices. Prior art clothes hanging devices may comprise hangers configured for engaging grab bars of vehicles, rods extendible between a floor and roof of a passenger compartment of a vehicle, rods engageable to a frame of a window of a vehicle, rods extendible between opposed sides of a passenger compartment of a vehicle, and brackets engageable to a hanger hook of a vehicle or posts of a headrest of a vehicle.

BRIEF SUMMARY OF THE INVENTION

An embodiment of the disclosure meets the needs presented above by generally comprising a strap, which has a pair of holes positioned therein. Each hole is positioned proximate to a respective opposed end of the strap. One of the holes is configured for insertion of a fixed hanger hook of a vehicle so that the strap is engaged thereto and hangs therefrom. The other of the holes is configured for insertion of a hook of a clothes hanger so that the clothes hanger is engaged to the strap and hangs therefrom.

The strap also is configured to be folded so that the holes of the pair of holes are aligned and configured for insertion of the fixed hanger hook of the vehicle. The strap thus defines a loop, which is configured for insertion of the hook of the clothes hanger so that the clothes hanger is engaged to the strap and hangs therefrom. Multiple clothes hangers with clothes thereon can be hung from the strap without impeding visibility.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1a is an isometric perspective view of an automotive clothes hanging device according to an embodiment of the disclosure.

FIG. 1b is an isometric perspective view of an automotive clothes hanging device according to an embodiment of the disclosure.

FIG. 2a is a rear view of an embodiment of the disclosure.

FIG. 2b is a rear view of an embodiment of the disclosure.

DETAILED DESCRIPTION OF THE INVENTION

Figure 3:
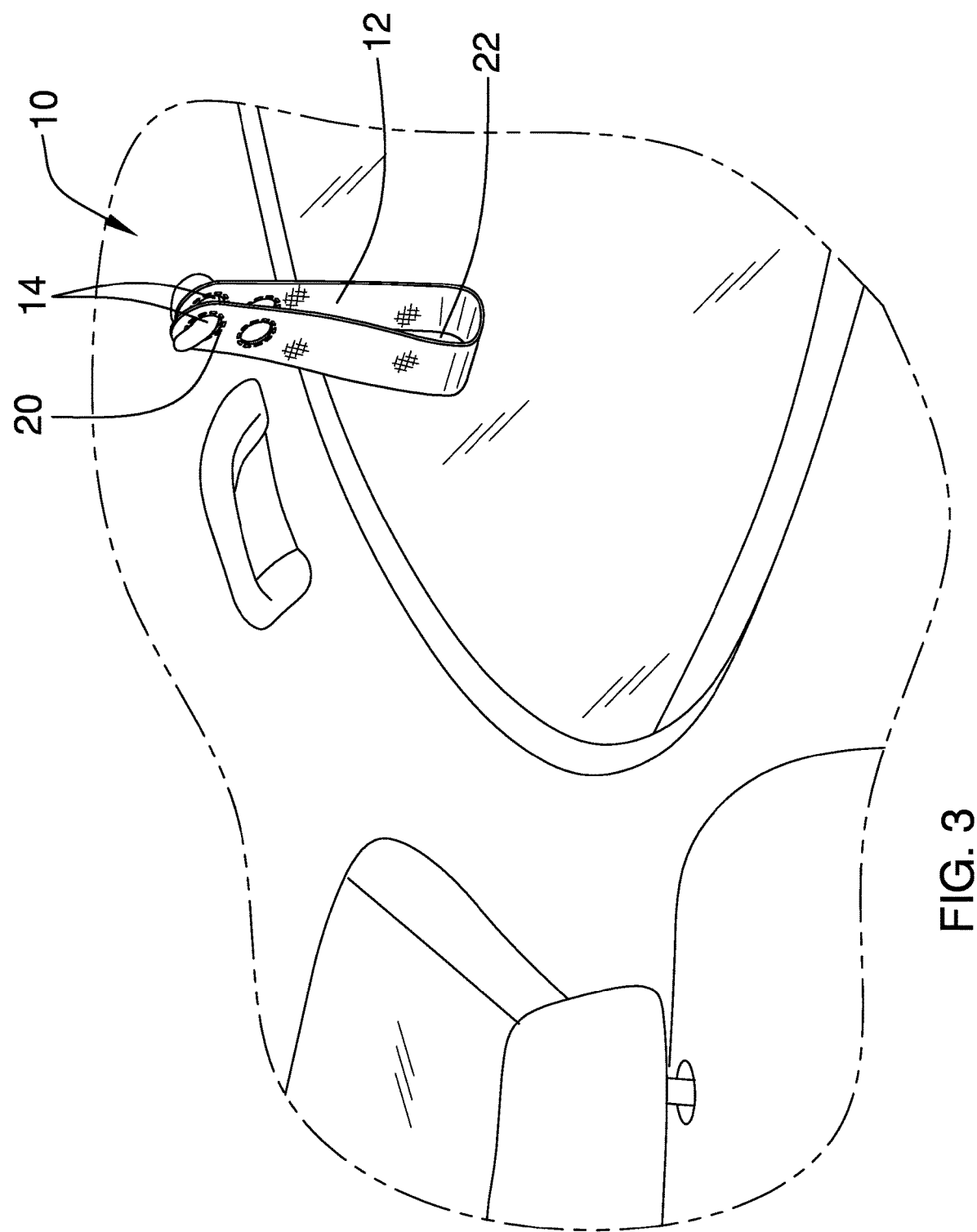
FIG. 3 is an in-use view of an embodiment of the disclosure.

With reference now to the drawings, and in particular to FIG. 1 through thereof, a new clothes hanging device embodying the principles and concepts of an embodiment of the disclosure and generally designated by the reference numeral 10 will be described.

As best illustrated in FIGS. 1 through 5, the automotive clothes hanging device 10 generally comprises a strap 12, which has a pair of holes 14 positioned therein. Each hole 14 is positioned proximate to a respective opposed end 16 of the strap 12. The opposed ends 16 may be arcuate, as shown in FIG. 2. The strap 12 comprises leather, nylon, silicone, rubber, or other resiliently bendable material, such as, but not limited to, canvas, plastic, and the like.

One of the holes 14 is configured for insertion of a fixed hanger hook of a vehicle so that the strap 12 is engaged thereto and hangs therefrom. The other of the holes 14 is configured for insertion of a hook of a clothes hanger so that the clothes hanger is engaged to the strap 12 and hangs therefrom. Multiple clothes hangers with clothes thereon can be hung from the strap 12, without impeding visibility, by inserting their hooks into the other of the holes 14.

The device 10 also comprises a pair of braces 18. Each brace 18 is engaged to the strap 12 so that the brace 18 extends circumferentially around a respective hole 14. The brace 18 is configured to resist tearing of the strap 12 upon hanging of the clothes hanger therefrom. The brace 18 may comprise stitching 20, as shown in FIG. 2, or other bracing means, such as, but not limited to, grommets and the like.

Figure 4:
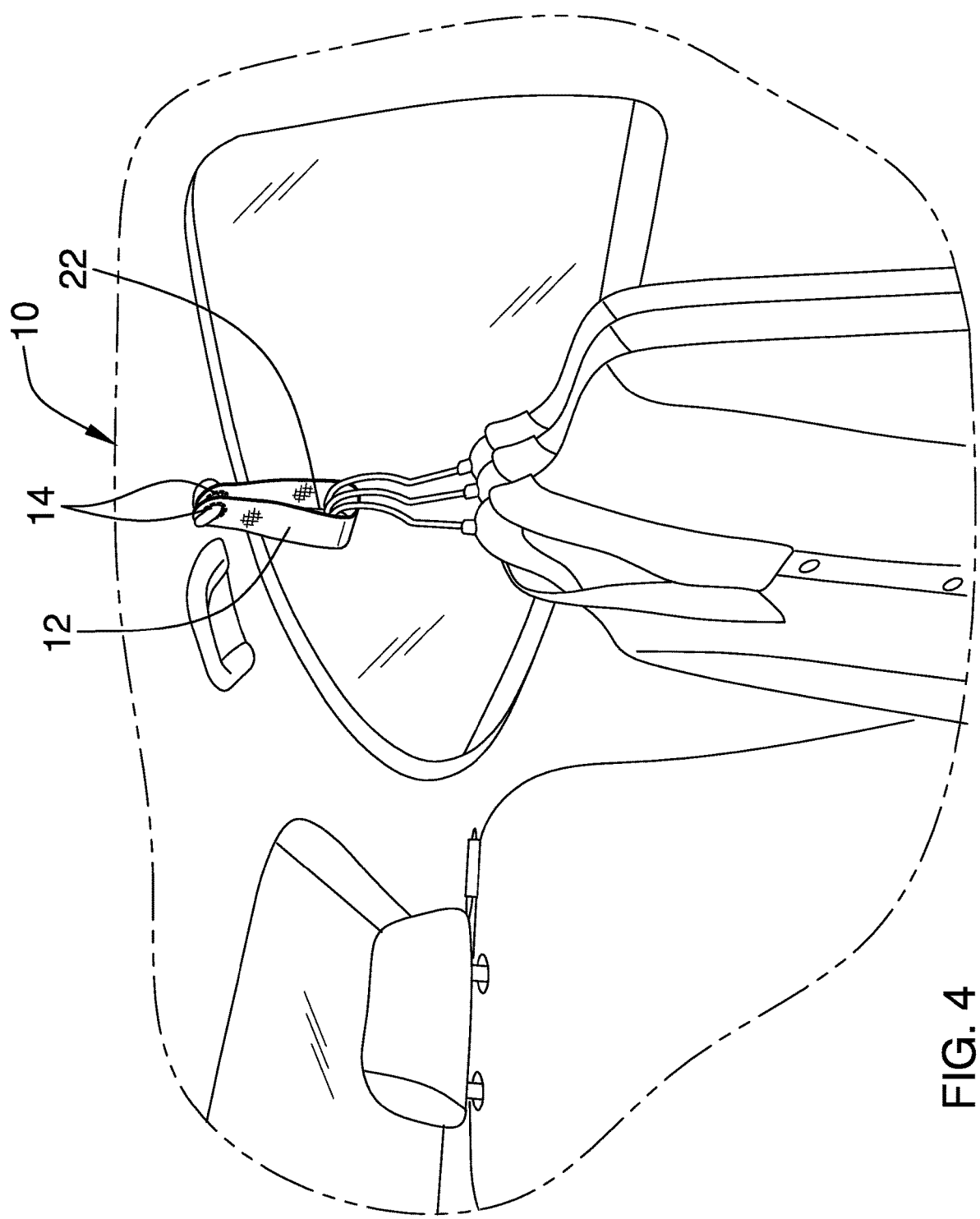
FIG. 4 is an in-use view of an embodiment of the disclosure.
Figure 5:
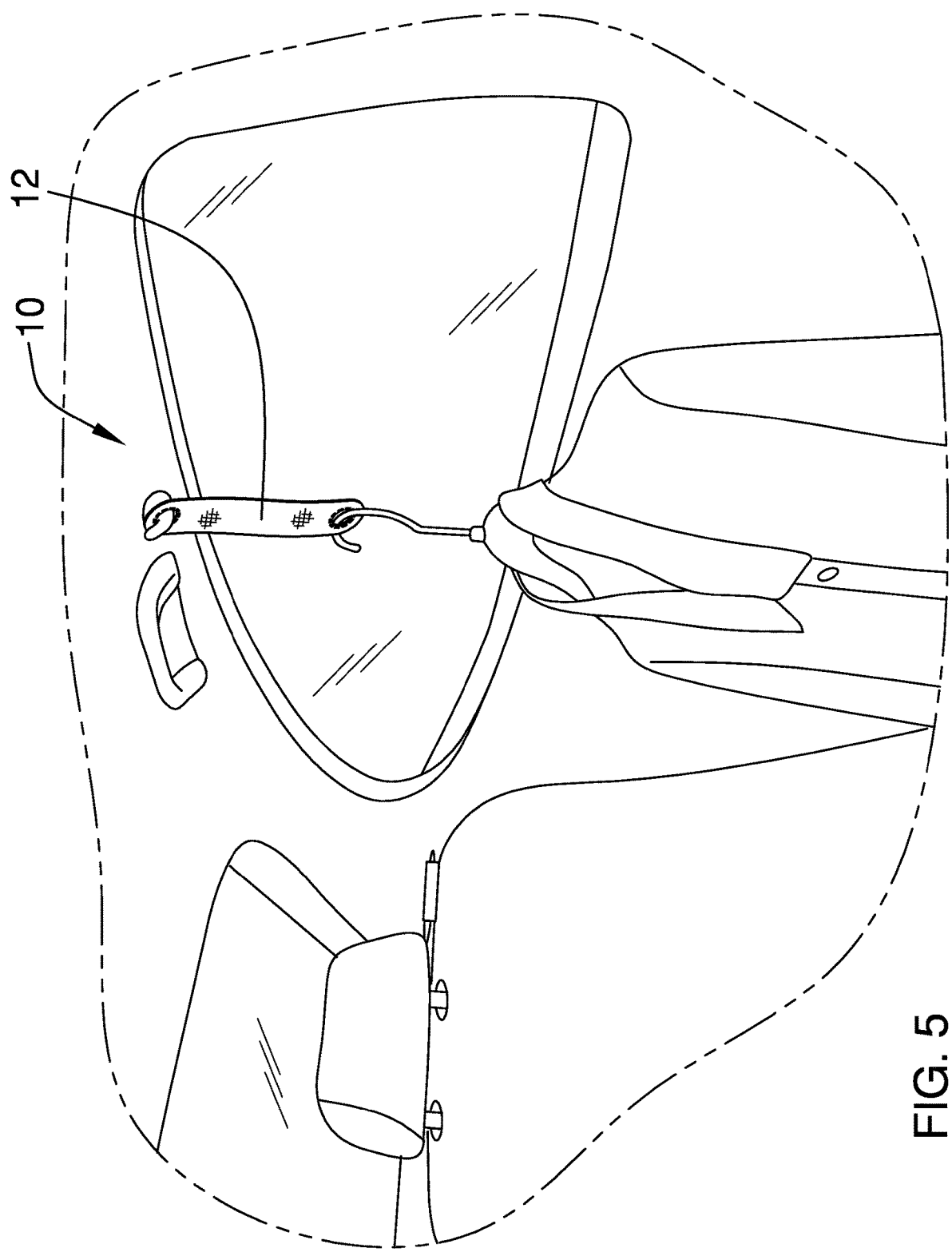
FIG. 5 is an in-use view of an embodiment of the disclosure.

The strap 12 also is configured to be folded so that holes 14 of the pair of holes 14 are aligned and configured for insertion of the fixed hanger hook of the vehicle, as shown in FIG. 3. The strap 12 thus defines a loop 22, which is configured for insertion of the hook of the clothes hanger so that the clothes hanger is engaged to the strap 12 and hangs therefrom, as shown in FIG. 4. Multiple clothes hangers with clothes thereon can be hung from the strap 12, without impeding visibility, by inserting their hooks into the loop 22.

In one embodiment, as shown to the left in each of FIGS. 1 and 2, each hole 14 of the pair of holes 14 comprises a plurality of orifices 24. The pluralities of orifices 24 enables a user to use a variety of methods in attaching the strap 12 to the fixed hanger hook of the vehicle. Additionally, multiple orifices 24 enable insertion of a larger number of hooks, therefor allowing more clothes hangers to be hung from the strap 12. Each plurality of orifices 24 may comprise two orifices 24, as shown in FIG. 2.

In one example of use, the fixed hanger hook of the vehicle is inserted into one of the holes 14 so that the strap 12 is engaged thereto and hangs therefrom. Hooks of one or more clothes hangers are inserted into the other of the holes 14 so that the clothes hangers are engaged to the strap 12 and hang therefrom.

In another example of use, the strap 12 is folded so that the holes 14 of the pair of holes 14 are aligned. The fixed hanger hook of the vehicle is inserted into the pair of holes 14 so that the strap 12 defines a loop 22. Hooks of one or more clothes hangers are inserted into the loop 22 so that the clothes hangers are engaged to the strap 12 and hang therefrom.

In still another example of use, the strap 12 is positioned around a coiled substrate, such a garden hose, electrical cord, and the like, such that the holes 14 of the pair of holes 14 are aligned. The pair of holes 14 thus is configured for insertion of an article of hanging hardware, such as a hook, nail, and the like, affixed to a surface, such as a wall in a garage, so that the coiled substrate hangs therefrom.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An automotive clothes hanging device comprising a strap having a pair of holes positioned therein, each hole being positioned proximate to a respective opposed end of the strap, wherein the strap is adapted to be placed in a first and a second configuration, wherein in the first configuration one of the holes is configured for insertion of a fixed hanger hook of a vehicle such that the strap is engaged thereto and hangs therefrom, wherein the other of the holes is configured for insertion of a hook of a clothes hanger, such that the clothes hanger is engaged to the strap and hangs therefrom, wherein in the second configuration the strap is configured for folding such that the holes of the pair of holes are aligned, wherein the pair of holes is configured for insertion of the fixed hanger hook of the vehicle such that the strap defines a loop, wherein the loop is configured for insertion of the hook of the clothes hanger, such that the clothes hanger is engaged to the strap and hangs therefrom.

2. The automotive clothes hanging device of claim 1, wherein the strap comprises leather, nylon, silicone, or rubber.

3. The automotive clothes hanging device of claim 1, wherein the opposed ends are arcuate.

4. The automotive clothes hanging device of claim 1, thither including a pair of braces, each brace being engaged to the strap such that the brace extends circumferentially around a respective hole, wherein the brace is configured for resisting tearing of the strap upon hanging of the clothes hanger therefrom.

5. The automotive clothes hanging device of claim 4, wherein the braces comprise stitching.

6. An automotive clothes hanging device comprising:
a strap having a pair of holes positioned therein, each hole being positioned proximate to a respective opposed end of the strap, wherein the strap is adapted to be placed in a first and a second configuration, wherein in the first configuration one of the holes is configured for insertion of a fixed hanger hook of a vehicle such that the strap is engaged thereto and hangs therefrom, wherein the other of the holes is configured for insertion of a hook of a clothes hanger, such that the clothes hanger is engaged to the strap and hangs therefrom, wherein in the second configuration the strap is configured for folding such that the holes of the pair of holes are aligned, wherein the pair of holes is configured for insertion of the fixed hanger hook of the vehicle such that the strap defines a loop, wherein the loop is configured for insertion of the hook of the clothes hanger, such that the clothes hanger is engaged to the strap and hangs therefrom, the strap comprising leather, nylon, silicone, or rubber, the opposed ends being arcuate; and
a pair of braces, each brace being engaged to the strap such that the brace extends circumferentially around a respective hole, wherein the brace is configured for resisting tearing of the strap upon hanging of the clothes hanger therefrom, the brace comprising stitching.

* * * * *